(12) United States Patent
Fan et al.

(10) Patent No.: US 8,323,417 B2
(45) Date of Patent: Dec. 4, 2012

(54) INHIBITING CORROSION AND SCALING OF SURFACES CONTACTED BY SULFUR-CONTAINING MATERIALS

(75) Inventors: Liang-tseng Fan, Manhattan, KS (US); Mohammad Reza Shafie, Manhattan, KS (US); Julius Michael Tollas, The Woodlands, TX (US); William Arthur Fitzhugh Lee, McLean, VA (US)

(73) Assignee: Green Source Energy LLC, Austin, TX (US)

( * ) Notice: Subject to any disclaimer, the term of this patent is extended or adjusted under 35 U.S.C. 154(b) by 0 days.

(21) Appl. No.: 12/742,345

(22) PCT Filed: Mar. 10, 2010

(86) PCT No.: PCT/US2010/026815
§ 371 (c)(1),
(2), (4) Date: Jul. 9, 2010

(87) PCT Pub. No.: WO2010/104944
PCT Pub. Date: Sep. 16, 2010

(65) Prior Publication Data
US 2011/0174334 A1    Jul. 21, 2011

(51) Int. Cl.
*B08B 17/02* (2006.01)
*B08B 3/08* (2006.01)

(52) U.S. Cl. ............... 134/6; 134/4; 510/245; 510/247; 510/405; 510/407; 510/461; 252/175; 252/180

(58) Field of Classification Search ...... 134/6; 510/405, 510/407, 461, 245, 247; 252/175, 180
See application file for complete search history.

(56) References Cited

U.S. PATENT DOCUMENTS

| | | | |
|---|---|---|---|
| 1,344,338 A * | 6/1920 | Eisenhauer | 106/14.34 |
| 2,324,980 A | 7/1943 | Kilbourne | |
| 2,356,254 A | 8/1944 | Lehmann, Jr. et al. | |
| 2,743,202 A * | 4/1956 | Amici | 148/246 |
| 3,971,628 A * | 7/1976 | Bresle | 422/7 |
| 4,098,707 A * | 7/1978 | Frangatos | 508/433 |
| 4,104,205 A | 8/1978 | Novotny et al. | |
| 5,248,343 A * | 9/1993 | Hamilton et al. | 134/10 |
| 5,284,625 A | 2/1994 | Isayev et al. | |
| 5,362,759 A | 11/1994 | Hunt et al. | |
| 5,602,186 A | 2/1997 | Myers et al. | |
| 5,677,354 A | 10/1997 | Oliveira Da Cunha Lima | |
| 5,817,186 A * | 10/1998 | D'Muhala et al. | 134/40 |
| 5,891,926 A | 4/1999 | Hunt et al. | |
| 6,380,269 B1 | 4/2002 | Benko et al. | |
| 6,416,705 B1 | 7/2002 | Dinzburg et al. | |
| 6,479,558 B1 | 11/2002 | Fliermans | |
| 6,541,526 B1 | 4/2003 | Goldshtein et al. | |
| 6,590,042 B1 | 7/2003 | Tang | |
| 6,831,109 B1 | 12/2004 | Beirakh et al. | |
| 6,872,754 B1 | 3/2005 | Wortham | |
| 6,924,319 B1 | 8/2005 | Alsdorf et al. | |
| 6,984,610 B2 | 1/2006 | VonKrosigk et al. | |
| 6,992,116 B2 | 1/2006 | Benko et al. | |
| 2004/0087449 A1 | 5/2004 | Furman et al. | |
| 2006/0042796 A1 | 3/2006 | Qu et al. | |
| 2006/0264335 A1 | 11/2006 | Penna et al. | |
| 2008/0139678 A1 | 6/2008 | Fan et al. | |

FOREIGN PATENT DOCUMENTS

EP    1724375 A2    11/2006

OTHER PUBLICATIONS

Bates.: "Elemental Sulfur as a Corrodent in Deaerated, Neutral Aqueous Solutions," Materials Performance, p. 56, 1981.
Chertkov et al.: "Corrosion activity of hydrocarbon fuels in the presence of elemental sulfur," Khimiia i tekhnologiia topliv i masel, vol. 3, No. 7, pp. 62-66, 1958.
Chow et al.: "Fluor SOx cleanup process a cost effective "SO2 to elemental sulfur" technology for global green environment," 2006 TMS Fall Extraction and Processing Division: Sohn International Symposium, vol. 8, Abstract, 1 page, 2006.
Cobb et al.: "Methods of Operation to Prevent Sulfite Liquor Evaporator Fouling," Pulping Conference, Proceedings of the Technical Association of the Pulp and Paper Industry, Abstract, p. 459, 1984.
Edward: "How much is pipeline corrosion affecting the oil and gas industry?" www.ngoilgasmena.com/news/pipeline-corrosion, 4 pages, Oct. 26, 2009.
Fernandes et al.: "Electrochemical determination of elemental sulfur in Brazilian naphtha: method and validation," J. Appl Electrochem., vol. 39, pp. 1655-1663, 2009.
Franey et al.: "Static Intercept Technology: A New Packaging Platform for Corrosion and ESD Protection," Bell Labs Technical Journal, vol. 11, No. 3, pp. 137-146, 2006.
Gscheidmeier et al.: "Turpentines," Ullmann's Encyclopedia of Industrial Chemistry, Sixth Completely Revised Edition, vol. 37, pp. 561 and 565, 2003.
Kennelley et al.: "Effect of Elemental Sulfur on the Performance of Nitrogen-Based Oilfield Corrosion Inhibitors," Environment Treatment & Control, pp. 48-52, 1990.
"Sulfur," Kirk-Othmer Encyclopedia of Chemical Technology, vol. 23, 5th Edition, pp. 1-37, Nov. 2006.
Kudo et al.: "Sulfur Scale Abatement System Using a Surfactant in Geothermal Power Plant Circulating Water," Proceedings World Geothermal Congress 2000, Kyushu-Tohoku, Japan, 5 pages, Jun. 10, 2000.

(Continued)

*Primary Examiner* — Michael Barr
*Assistant Examiner* — Natasha Campbell
(74) *Attorney, Agent, or Firm* — Rothwell, Figg, Ernst & Manbeck, P.C.

(57) ABSTRACT

A method of treatment for inhibiting sulfur-based corrosion or scaling or for removing scaling from a surface including inhibiting corrosion caused by sulfur-containing materials, reducing corrosion caused by sulfur-containing materials, inhibiting scaling caused by sulfur-containing materials in gas, liquid or solid phase or any combination of multiple phases of materials, reducing scaling caused by sulfur-containing materials, and removing scaling caused by sulfur-containing materials. The method involves contacting sulfur-containing materials with a composition containing a turpentine liquid. The method also involves contacting corrodible surfaces or surfaces prone to scaling with a composition containing a turpentine liquid.

27 Claims, 11 Drawing Sheets

OTHER PUBLICATIONS

Laitinen: "Thiosulfate pitting corrosion of stainless steels in paper machine environment," Dissertation to be presented at Helsinki University of Technology, 35 pages, Dec. 3, 1999.

Levine et al.: "Hydrogen sulfide and turbidity control using catalysed oxidation coupled with filtration for groundwater treatment," Journal of Water Supply: Research and Technology—AQUA, pp. 325-337, 2004.

Liang: "Reduced Sulphur Compounds in Ambient Air and in Emissions from Wastewater Clarifiers at a Kraft Pulp Mill," Thesis submitted to Dept. of Chemical Engineering and Applied Chemistry, University of Toronto, 245 pages, 2008.

Lens et al.: "Biotechnological Treatment of Sulfate-Rich Wastewaters," Critical Reviews in Environmental Science and Technology, vol. 28, No. 1, pp. 41-88, 1998.

Long et al.: "Creeping Corrosion of PWB Surfaces in Harsh Sulfur containing Environments," SMTA International Conference, www.circuitree.com/Articles/MacDermid_Articles/, 6 pages, Aug. 17, 2008.

Lundstrom et al.: "Reaction product layer on chalcopyrite in cupric chloride leaching," Canadian Metallurgical Quarterly, vol. 47, No. 3, Abstract, 1 page, Jul. 2008.

Maeda et al.: "Isolation of iron-oxidizing bacteria from corroded concretes of sewage treatment plants," Journal of Bioscience and Bioengineering, vol. 88, No. 3, Abstract, 1 page, Sep. 1999.

Marcus: "Sulfur-Assisted Corrosion Mechanisms and the Role of Alloyed Elements," Corrosion Technology, vol. 17, pp. 287-310, 2002.

Schmitt: "Effect of Elemental Sulfur on Corrosion in Sour Gas Systems," Corrosion, vol. 47, No. 4, pp. 285-308, 1991.

Steinbeck et al.: "Elemental sulfur corrosion—A German Iron and Steel Institute (VDEh) test specification gains international acceptance," Materials and Corrosion, vol. 51, pp. 808-810, 2000.

Tems et al.: "Corrosion of Electronic Control Systems in Gas Treating Environments," NACE International Corrosion 2007 Conference & Expo, Paper 07400, 16 pages, 2007.

Wang: "Characteristics and Corrosivity of Corrosive Substances in Jet Fuel," Corrosion Science and Protection Technology, vol. 18, No. 5, pp. 361-363, 2006.

Zhang: "Monitoring of stress corrosion cracking of sensitised 304H stainless steel in nuclear applications by electrochemical methods and acoustic emission," Energy Materials: Materials Science and Engineering for Energy Systems, vol. 3, No. 2, Abstract, 1 page, 2008.

* cited by examiner

A

B

A)

B)

C)

INHIBITING CORROSION AND SCALING OF SURFACES CONTACTED BY SULFUR-CONTAINING MATERIALS

CROSS REFERENCE TO RELATED APPLICATIONS

This application is a 35 U.S.C. §371 National Phase Entry Application from PCT/US2010/026815, filed Mar. 10, 2010, and designating the United States, which claims priority to PCT Application No. PCT/US2009/037112 filed Mar. 13, 2009, which are incorporated herein in their entireties.

FIELD OF THE INVENTION

The present invention relates to the field of inhibiting, reducing, preventing, and removing corrosion and scaling on surfaces contacted by sulfur-containing materials.

BACKGROUND OF THE INVENTION

It is known from laboratory studies and field trials that elemental sulfur reacts aggressively with metals in the presence of water or aqueous solution. The accelerated attack on metals caused by elemental sulfur results in pitting, stress cracking, and mass-loss corrosion. According to the Federal Highway Administration study entitled *Corrosion Costs and Preventive Strategies in the United States*, the total annual estimated direct cost of corrosion in the U.S. in 1998 was approximately $276 billion (approximately 3.1% of U.S. gross domestic product).

Elemental sulfur is a strong oxidizer, causing corrosion where it attaches to the wet steel surface. Elemental sulfur can occur when oxygen mixes with $H_2S$ or may be produced naturally. There are few, if any, commercial inhibitors that effectively protect against corrosion caused by elemental sulfur.

The trend to use more ImAg (immersion silver) surface finish and shy away from SnPb HASL (Stannum Lead Anti-Hot Air Solder Leveling) on electronic products has resulted in corrosion failure occurrences when these products are exposed to high sulfur environments under elevated humidity. The resulting creep corrosion constituent is primarily $Cu_2S$ which is produced by galvanic driven attack of the copper beneath the edge of the soldermask. Electronic hardware manufacturers are experiencing, or will soon experience product reliability problems due to sulfur corrosion at tire burning factories, paper mills, fertilizer plants, and polluted locations in developing countries. This new unexpected failure mechanism demands a controlled process by which products can be qualified to ensure they will not fail in these applications.

Prior methods to combat corrosion have included protective organic coatings, cement, sacrificial anodes, various inhibitors cathodic protection, and spray-coating corrosion-susceptible surfaces with corrosion-resistant metals. These methods have been variably effective at reducing corrosion rates and come with variable costs and safety considerations. For example, imidazoline-based inhibitors have been shown to be ineffective in controlling the accelerated localized attack caused by elemental sulfur while chromate and hydrazine are effective for inhibiting corrosion but are carcinogenic.

The inhibition of corrosion on corrodible surfaces in contact with sulfur-containing materials, in solid, semi-solid, liquid, or vapor form has proven to be extremely challenging. The difficulty can in part be attributed to the fact that these materials contain elemental sulfur, sulfur compounds, and other corrosive elements such as salts, acids, and corrosive gases which contact corrodible surfaces that give up electrons, becoming themselves positively charged ions in an electrochemical reaction. When concentrated locally, this reaction forms a pit or a crack, but may also extend across a wide area to produce general corrosion.

Chemical and biological origins are considered to be involved in the corrosion-causing sulfur reactions. The production of sulfur from the chemical origin is governed by the oxidation-reduction potential and pH, while bacteria, such as sulfur bacteria, participate in the formation of sulfur from biological origin.

It is widely recognized that microorganisms attach to, form films on, and influence corrosion on surfaces, especially in aqueous environments. Microorganisms causing sulfur-based corrosion include *Halothiobacillus neapolitanus, Thiobacillus ferroxidans Acidothiobacillus thiooxidans, Ferrobacillus ferrooxidans, Thiobacillus thiooxidans, Thiobacillus thioparus, Thiobacillus concretivorus, Desulfovibrio* and *Desulfotomaculum, Sphaerotilus, Gallionella, Leptothrix, Crenothrix, Clonothrix*, and *Siderocapsa*. The microorganisms change the electrochemical conditions at the surface which may induce localized corrosion and change the rate of general corrosion. Some microorganisms reduce sulfate and produce hydrogen sulfide or oxidize $H_2S$ gas to solid sulfur, which can lead to corrosion. Some bacteria produce acids and other corrosive compounds on the surfaces leading to even further corrosion. In addition to metal surfaces, microbial corrosion can also apply to plastics, concrete, and many other materials. The use of surfactants to suppress sulfur bacteria have proven ineffective for longer periods of time, requiring service within a year of use (Kudo and Yuno, Proceedings World Geothermal Congress, 2000).

Formation of scale caused by sulfur or sulfur compounds or from corrosion products adhering to the inner surfaces of pipes serves to decrease ability to transfer heat and to increase the pressure drop for flowing fluids. Also, in the presence of other impurities such as ions of calcium and magnesium in a liquid, e.g., water, gives rise to the formation of scale or voluminous precipitate, thus fouling the surfaces. Scale is an assemblage of precipitates that adhere to surfaces along water paths. Accumulated solid layers of impermeable scale can line pipes and tubes, sometimes completely blocking flow. Metal sulfates, e.g., barium and calcium sulfates, form the most persistent scale, which often requires shutdown of operations for mechanical removal from the metal walls of pipes, boilers, refinery equipment, production tubing, tanks, valves, etc. In boilers, scale results in reduced heat transmission, higher fuel usage, pipe blockage, and local overheating which can damage the boilers. In industrial operations, scale buildup reduces output, puts pressure on pumps, turbines and propellers, and engines, and eventually requires systemic shutdown for scale removal. Thus, in addition to direct removal costs, the indirect costs of scaling are enormous in terms of equipment damage, reduced efficiency, and deterred production. Thus, it is preferable to prevent or reduce scaling as much as possible.

Chemical treatment is often the first approach in attempts to inhibit, reduce, or remove scale. It is more advantageous when conventional mechanical methods are ineffective or expensive to deploy. Prior chemical techniques include contacting the substrate with alkaline salts, acids, inhibitors such as phosphate compounds, chelating solutions, and dispersing agents. Such methods tend to often be ineffective and sometimes dangerous or impractical. Often, not enough scale is removed or inhibited or the chemicals are not compatible with the systems requiring treatment. Hydrochloric acid is often the first choice for scale treatment, but the acid reaction produces by-products which are excellent initiators for reformation of scale deposits. Further, in acid descaling, the system must be shut down, drained, acid cleaned, rinsed, drained and retreated. Ethylenediamenetetraacetic acid (EDTA), a chelator, is also commonly used to stoichiometrically sequester metal ions; however, EDTA is slower than hydrochloric acid and stoichiometric treatments require significant concentrations to prevent scale formation. Because of the disadvantages of chemical treatments, they have sometimes been abandoned in favor of, or combined with, mechanical techniques to remove or reduce scaling.

Earlier mechanical techniques for scale removal included explosives to rattle and break off scale, but often damaged the substrate and did not effectively remove scale. Modern mechanical techniques include shot blasting, abrasive blasting, water jetting, pressurized air blasting, grinding, milling, impact hammering, and shock waves. These tools require full access to the substrate surfaces plagued by scaling and are seldom effective at completely removing scale to the bare walls. Residual scale on surfaces encourages new growth and makes scale inhibitor treatments more difficult. Further, such methods, especially abrasives, can damage substrate surfaces.

Prior techniques have failed to safely and effectively prevent, reduce, or remove scale and corrosion. A need exists for methods and compositions to inhibit corrosion of corrodible surfaces by preventing deposition and/or removing sulfur and other corrosive molecules from corrodible surfaces. There is also a need for scale-prevention, scale-reduction, and scale-removal techniques that are more effective, quick, and non-damaging to the substrate and environment.

SUMMARY OF INVENTION

In accordance with one embodiment of the present invention, the present invention provides a composition and a method for reducing the rate of or inhibiting the corrosion of a corrodible surface or material. Surfaces that contact sulfur-containing materials, e.g., transformers, pipes, tanks, pumps, water distribution systems, wastewater and sewage distribution and treatment equipment, electronics, semiconductors, wood, pulp, paper mills, oil field electronics, flue gas stacks, conductor and transmission wires, mineral processing, hydrometallurgy operations, metal extraction processes, and metal purification operations are prone to corrosion and/or scaling. By reducing the corrosion and scaling that afflicts such surfaces, significant cost savings are realized.

In this invention, a composition containing a turpentine liquid is used to reduce, prevent, or inhibit corrosion from occurring. In one embodiment corrodible materials are treated with the inventive composition. In another embodiment, the composition is added to a sulfur-containing material that contacts corrodible surfaces. In yet another embodiment, corrodible materials are treated with the composition and the composition is added to sulfur-containing material that contacts corrodible surfaces to provide even further protection. The present invention takes advantage of the very strong physico-chemical affinity of the turpentine liquid to sulfur and sulfur compounds.

In another embodiment, descaling, scale inhibition, fouling inhibition and/or fouling reduction is accomplished by the method of the present invention. A composition containing a turpentine liquid is used to reduce, inhibit, and/or remove scaling from surfaces. Scaled surfaces or any surfaces prone to scaling are treated with the composition and/or the composition is added to materials which contact the surfaces that are scaled or prone to scaling.

BRIEF DESCRIPTION OF THE DRAWINGS

FIG. 1A shows the mounted test coupons, and FIG. 1B shows a close up of the crevice washer.

FIG. 2A is the coupons after being chemically cleaned, and FIG. 2B is the coupons just removed from the baseline solution.

FIG. 3A is the front of test coupon 02, and FIG. 3B is the back of the coupon 02.

FIG. 4A is the front and back of a test coupon treated with inhibitor II, FIG. 4B is the front and back of a test coupon treated with inhibitor I, and FIG. 4C is the front and back of a test coupon treated with inhibitor III.

FIG. 5C is a 10× magnification of the 14 day baseline coupon after testing showing pitting. FIG. 5D is a 10× magnification of the 14 day baseline coupon after testing showing edge attack (circled).

FIGS. 6C and 6D are 10× magnifications of the 14 day baseline coupon after testing showing incipient pitting.

FIGS. 7C and 7D are 10× magnifications of the 14 day baseline coupon after testing showing incipient pitting.

FIG. 9A shows the test coupon with the sulfur pieces before test; FIG. 9B shows the top; FIG. 9C shows the bottom of the coupon after the test; and FIG. 9D is a close up of the pitting on the uninhibited coupon.

FIG. 10A shows the test coupon with the sulfur pieces before inhibitor I test; and FIG. 10B shows the top and FIG. 10C shows the bottom of the inhibitor I coupon after the test. FIG. 10D shows the test coupon with the sulfur pieces before inhibitor II test. FIG. 10E shows the top and FIG. 10F shows the bottom of the inhibitor II coupon after the test.

FIG. 11A shows the test bottle without inhibitor before mixing; FIG. 11B shows the test bottle without inhibitor after mixing; FIG. 11C shows the test bottle with inhibitor I before mixing; FIG. 11D shows the test bottle with inhibitor I after mixing; FIG. 11E shows the test bottle with inhibitor II before mixing; and FIG. 11F shows the test bottle with inhibitor II after mixing.

DETAILED DESCRIPTION OF THE INVENTION

Figure 1:
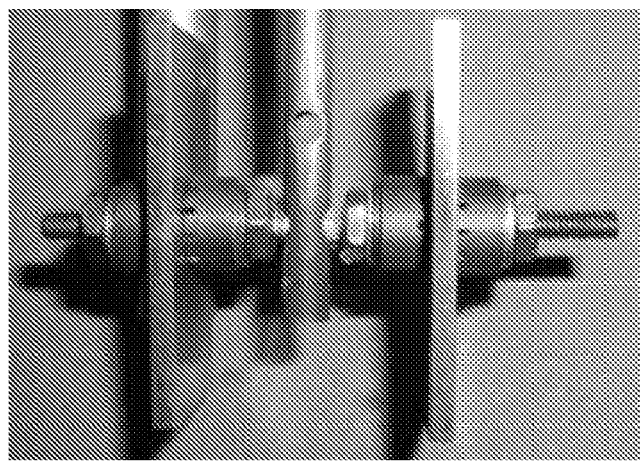
FIG. 1 shows the details of the multiple crevice assembly for the corrosion tests.
Figure 1:
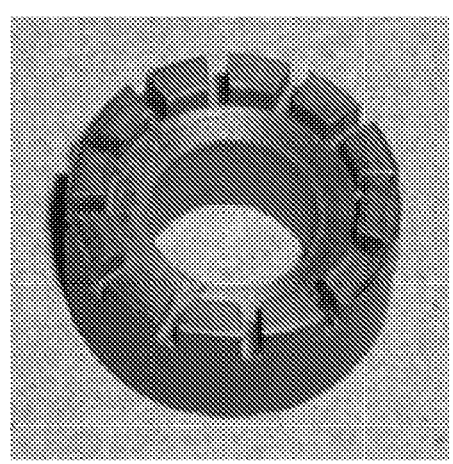

In one aspect, the present invention relates to a readily deployable composition for the reduction, prevention, and/or inhibition of corrosion on corrodible surfaces that are contacted by sulfur-containing materials.

According to one embodiment, a method is provided including the steps of inhibiting, reducing, or preventing corrosion caused by sulfur-containing materials including those containing elemental sulfur and sulfur compounds. The present invention inhibits all types of corrosion including, but not limited to, pitting corrosion, general or uniform corrosion, creep corrosion, stress corrosion, blistering, vapor phase corrosion, crevice corrosion, welding corrosion, and microbial corrosion. As used herein, sulfur-containing materials include any material that comprises elemental sulfur or sulfur compounds, e.g., hydrogen sulfide, sulfates, sulfur containing salts and acids, sulfides, disulfides, mercaptans, thiophenes, and benzothiophenes. Examples of sulfur-containing materials include, but are not limited to, hydrocarbon-containing materials, non-hydrocarbon containing materials including wastewater, groundwater, sewage, pulp water, cooling fluids, gases, and solids. In one embodiment, the hydrocarbon-containing material can be a natural or synthetic hydrocarbon-containing material. Some examples of natural hydrocarbon-containing materials are coal, crude oil, tar, tar sands, oil shale, oil sands, natural gas, petroleum gas, crude bitumen, natural kerogen, natural asphalt, and natural asphaltene. Natural hydrocarbon-containing materials can be obtained from a natural formation.

Many different surfaces are prone to corrosion, especially metal surfaces, e.g., steel, aluminum, and copper. However, composite, concrete, plastic, natural polymers, wood, and glass surfaces are also prone to corrosion.

In another embodiment, the present invention inhibits, reduces, or prevents corrosion caused by microbial action.

Inhibiting, reducing, or preventing corrosion includes the step of providing a sulfur-containing material, contacting the sulfur-containing material with the corrosion-inhibiting composition of the present invention prior to or during the sulfur-containing material's contact with a corrodible surface. In some embodiments, it is preferable for the corrosion-inhibiting composition to increase the sulfur-containing material's viscosity. The corrosion-inhibiting composition comprises, consists essentially of, or consists of an amount of a turpentine liquid, e.g., terpineol. Turpentine derived from natural sources generally includes an amount of terpene. In one embodiment, the turpentine liquid includes a terpineol. Optionally, the corrodible surface may be contacted with the corrosion-inhibiting composition of the invention prior to, during, or after its contact with sulfur-containing materials. For example, the corrosion-inhibiting composition can be used in maritime applications, e.g., on ships, boats, shipping containers, hot chambers of civilian and military naval vessels, port and offshore structures, in aerospace applications, e.g., on airplane and helicopter frames and components, military and civilian jet plane exhaust components, and jet engine turbine blades, on flue and exhaust stacks, e.g., power plant flue stack walls, gas turbine blades in power plants, pipes, tanks, boilers, heaters, and electronics applications, e.g., on wires, electronics, or semiconductors.

The inventive method and composition also have applications during transportation, drilling, downhole operations, exploration, hydrocarbon production, storage, handling, or production of hydrocarbon-containing materials, for example by pipelines, tankers, casings, fishing tools, or drill bits, and other surfaces that contact sulfur-containing compounds.

In further embodiments, the turpentine liquid can be separated from the sulfur-containing materials, recycled, and/or reused to maintain corrosion inhibition.

In yet another embodiment, the corrosion-inhibiting composition can be applied as a layer over and/or under another protective layer of a surface. For example, to protect corrodible metal surfaces, the corrosion-inhibiting composition can be applied over or under a chemical oxidization layer. In another embodiment, the corrosion-inhibiting composition can be applied as a layer over and/or under an insulation layer on a substrate. Examples of insulation layers include, but are not limited to, oxides, nitrides, and polymers.

The present invention provides a method for significantly reducing corrosion by the addition of a corrosion-inhibiting composition to a sulfur-containing material. When a sulfur-containing material is mixed with the corrosion-inhibiting composition, the corrosion rate of the corrodible surfaces contacted with the mixture is substantially reduced as compared to corrosion of these surfaces when contacted with sulfur-containing material in the absence of the corrosion-reducing liquid. In one embodiment, the corrosion-inhibiting composition does not produce a stable sulfonated component. In another embodiment, sulfur does not accumulate in the turpentine liquid.

In some embodiments, the composition comprises, consists essentially of, or consists of at least from about 0.0001 to 0.002% by volume of the corrosion-inhibiting composition. In another embodiment, the composition comprises, consists essentially of, or consists of at least from about 0.0005% by volume of the corrosion-inhibiting composition. In a further embodiment, the composition comprises, consists essentially of, or consists of at least from about 0.001% by volume of the corrosion-inhibiting composition. In a further embodiment, the composition comprises, consists essentially of, or consists of at least from about 0.0015% by volume of the corrosion-inhibiting composition. In a further embodiment, the composition comprises, consists essentially of, or consists of at least from about 0.001% to 0.002% by volume of the corrosion-inhibiting composition. In another embodiment, the composition comprises, consists essentially of, or consists of at least from about 0.01% to 10% by volume of the corrosion-inhibiting composition. In a further embodiment, the composition comprises, consists essentially of, or consists of at least from about 0.1% to 5% by volume of the corrosion-inhibiting composition. In yet another embodiment, the composition comprises, consists essentially of, or consists of at least from about 0.5% to 2% by volume of the corrosion-inhibiting composition. In a further embodiment, the composition comprises, consists essentially of, or consists of at least from about 1% by volume of the corrosion-inhibiting composition.

In a further embodiment, the rate of corrosion is reduced by at least about 2-fold as compared to corrosion of the surface when contacted with a sulfur-containing material in an absence of the corrosion-inhibiting composition. In this embodiment, the method employs an effective amount of the turpentine liquid acting as the active ingredient to achieve the at least 2-fold level of corrosion reduction.

In another embodiment the rate of corrosion is reduced by at least about 3-fold. In a further embodiment, the rate of corrosion is reduced by at least about 4-fold as compared to corrosion of the surface when contacted with a sulfur-containing material in an absence of the corrosion-inhibiting composition.

In certain embodiments, the turpentine liquid is selected from natural turpentine, synthetic turpentine, mineral turpentine, pine oil, α-pinene, β-pinene, α-terpineol, β-terpineol, γ-terpineol, polymers thereof, and mixtures thereof. In certain other embodiments, the turpentine liquid is selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In other embodiments, the turpentine liquid is selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof.

The corrosion-inhibiting composition may be used as a liquid composition, or in the vapor phase, nebulized, aerosolized, or applied as a solid, a thin-film, a condensate, a particulate, or a gel. In one embodiment, the composition may be deposited as a controlled condensation of molecular or atomic compounds in liquid or gas phase by a physical or chemical process. The composition may include appropriate additional ingredients to stabilize the composition in a desired state. For example, the composition can include paints or coating ingredients and be painted, coated, or sprayed onto a substrate. Any chemical deposition technique may be used, for example: Chemical Solution Deposition (CSD), in the liquid phase by spin-on, aerosol deposition, dipping, electrochemical Deposition (ECD), anodization or electrophoretic deposition, in the vapor phase by Chemical Vapor Deposition (CVD), as well as thermal, plasma, and/or photo deposition. Any physical deposition technique may also be used, for example: Physical Vapor Deposition (PVD), sputtering, evaporation, and/or Molecular Beam Deposition (MBD).

Another embodiment of the invention comprises contacting the sulfur-containing material and/or corrodible surface with a turpentine liquid mixture hereinafter referred to as the blend of turpentine liquids. The blend of turpentine liquids includes $\alpha$-terpineol, $\beta$-terpineol, $\beta$-pinene, and p-cymene. In one embodiment, the multi-component turpentine liquid includes at least about 30% $\alpha$-terpineol, and at least about 15% $\beta$-terpineol. In another embodiment, the blend of turpentine liquids includes about 40-60% $\alpha$-terpineol, about 30-40% $\beta$-terpineol, about 5-20% $\beta$-pinene, and about 0-10% p-cymene. In another embodiment, the blend of turpentine liquids includes about 50% $\alpha$-terpineol, about 35% $\beta$-terpineol, about 10% $\beta$-pinene, and about 5% p-cymene. In an alternative embodiment, a blend of turpentine liquids includes about 40-60% $\alpha$-terpineol, about 30-40% $\alpha$-pinene, about 5-20% $\beta$-pinene, and about 0-10% p-cymene. In another embodiment, a blend of turpentine liquids includes about 50% $\alpha$-terpineol, about 35% $\alpha$-pinene, about 10% $\beta$-pinene, and about 5% p-cymene.

In certain embodiments, the amount of turpentine liquid added to the sulfur-containing material is in a range of about 1 ppm and about 10,000 ppm, or in a range of about 10 ppm and about 1,000 ppm. In another embodiment the ratio of turpentine liquid to sulfur-containing material is in a range of about 50 ppm and about 500 ppm. Preferably, about 100 ppm of the turpentine liquid is used. In other embodiments, the ratio of turpentine liquid to sulfur in the sulfur-containing material can be in the range of about 1:10 to about 10:1, preferably greater than or equal to about 1:1, and yet more preferably greater than or equal to about 3:1. In other embodiments the ratio can be greater than or equal to about 4:1 or 5:1. The amount of sulfur may be measured or estimated and refers to elemental sulfur and sulfur compounds, including but not limited to, metal sulfates, sulfides, sulfites, sulfur-containing gases, and sulfur-containing salts and sulfur-containing acids.

In certain embodiments, the corrosion rate of the corrodible surface can be reduced by at least about 20-40%. In preferred embodiments, the corrosion rate is reduced by at least about 30%, 50%, or 75%.

In one embodiment of the invention, the corrosion-inhibiting composition comprises, consists essentially of, or consists of natural, synthetic or mineral turpentine, which can include $\alpha$-terpineol, or be $\alpha$-terpineol itself.

In certain embodiments, the corrosion-inhibiting composition can be used at a temperature within the range of about 2° C. to about 300° C. In certain embodiments, the sulfur-containing material and/or corrodible surface to be treated is contacted with a turpentine liquid at a temperature of less than about 300° C., less than about 120° C., less than 60° C., or at room temperature. In certain other embodiments, the corrodible material to be protected can be immersed in, coated with, sprayed with, or covered with one or more turpentine liquids.

The present invention avoids the environmental, economic, and practical disadvantages that have plagued prior corrosion and scale inhibitor and removal techniques. To date, chemical and mechanical methods have been used with varying degrees of success. However, each of these known solvent formulations may have certain drawbacks that one or more embodiments of the current invention overcome. In one embodiment, the renewable and "green" corrosion inhibiting liquids of the present invention are naturally derived and free of carcinogenic and pollutant chemicals. Further, the use of the corrosion-inhibiting composition of the present invention for protecting corrosion of corrodible surfaces by sulfur-containing materials avoids the economic and environmental costs associated with other known techniques for corrosion inhibition.

According to an aspect of the present invention, secondary ingredients can be added to the turpentine liquid. According to a certain aspect of the invention, the secondary ingredients can be selected at least one of 2,4 diamino-6-mercapto salts, triazoles, e.g., totyl- and benzo-triazole, dibenzo disulfide, vanadium compounds, ammonium polysulfide, oligoquinolinium metal oxide salts, hexylamine, and treatment compounds disclosed in U.S. Pat. No. 6,328,943, which is incorporated herein by reference, diluents, e.g., lower aliphatic alcohols, alkanes, aromatics, aliphatic amines, aromatic amines, carbon bisulfide, decant oil, light cycle oil and naphtha, and buffers.

As used herein, lower aliphatic alcohols refers to primary, secondary and tertiary monohydric and polyhydric alcohols of between 2 and 12 carbon atoms. As used herein, alkanes refers to straight chain and branched chain alkanes of between 5 and 22 carbon atoms. As used herein, aromatics refers to monocyclic, heterocyclic and polycyclic compounds. As used herein, aliphatic amines refers to primary, secondary and tertiary amines having alkyl substituents of between 1 and 15 carbon atoms. In certain embodiments, benzene, naphthalene, toluene or combinations thereof are used. In another embodiment, the lower aliphatic alcohols noted above can be used. In one embodiment the solvent is selected from ethanol, propanol, isopropanol, butanol, pentane, heptane, hexane, benzene, toluene, xylene, naphthalene, anthracene, tetraline, triethylamine, aniline, carbon bisulfide, and mixtures thereof.

EXEMPLARY EMBODIMENTS FOR CARRYING OUT THE INVENTION

In one embodiment, the present invention provides a method of treatment for inhibiting sulfur-based corrosion or scaling or for removing scaling from a surface. The inventive method includes inhibiting corrosion caused by sulfur-containing materials, reducing corrosion caused by sulfur-containing materials, inhibiting scaling caused by sulfur-containing materials, reducing scaling caused by sulfur-containing materials, and removing scaling caused by sulfur-containing materials. The method includes contacting sulfur-containing materials with a composition comprising, consisting essentially of, or consisting of a turpentine liquid. In a further embodiment, the inventive method includes contacting the surface with the inventive composition. In yet another embodiment, the inventive method involves both contacting the sulfur-containing material and the surface with a composition comprising, consisting essentially of, or consisting of a turpentine liquid.

The turpentine liquid can comprise, consist essentially of, or consist of natural turpentine, synthetic turpentine, mineral turpentine, pine oil, α-pinene, β-pinene, α-terpineol, β-terpineol, γ-terpineol, terpene resins, α-terpene, β-terpene, γ-terpene, geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof.

The corrosion-inhibiting and/or scale-inhibiting composition is said to consist essentially of the turpentine liquid if the turpentine liquid is the essential active ingredient for substantially all of the corrosion and/or scaling inhibition and other ingredients in the composition are essentially inactive or non-active in corrosion and/or scaling inhibition. Thus, in certain embodiments, the basic and novel characteristics of the present invention include a composition consisting essentially of a turpentine liquid that excludes other active corrosion inhibiting ingredients.

In certain embodiments, the inventive composition is substantially acid free or the method involves contacting said surface or sulfur-containing material with a substantially acid free turpentine liquid. A substantially acid-free composition contains less than about 10% acid. In a preferred embodiment, a substantially acid-free composition contains less than about 5% acid. In yet a more preferred embodiment, a substantially acid-free composition contains less than about 3% acid. In an even more preferred embodiment, a substantially acid-free composition contains less than about 1% acid. By using a substantially acid-free composition, the present invention avoids the problems associated with acid-containing compositions that initiate new scaling and corrosion from the byproducts generated by acid-sulfur contact.

In another embodiment, the inventive composition is substantially non-aqueous or the method involves contacting said surface or sulfur-containing material with a substantially non-aqueous turpentine liquid. In a preferred embodiment the turpentine liquid is non-aqueous. By using a substantially non-aqueous composition, the present invention avoids the problems associated with aqueous compositions that initiated new scaling and corrosion from the byproducts generated by water-sulfur contact.

In yet another embodiment, the invention comprises using a composition that consists essentially of a turpentine liquid, i.e, is a substantially non-aqueous and/or substantially acid-free turpentine liquid. By using a substantially sulfur-free composition, the present invention avoids the problems associated sulfur-containing compositions that initiate new scaling and corrosion from reactions with sulfur contained within the existing anti-corrosion and/or anti-scaling compositions.

In one embodiment, the composition of the present invention is substantially free of sulfur compounds, acids, or salts. In a further embodiment, the invention comprises using a composition that consists essentially of a sulfur-free turpentine liquid, i.e, is a substantially non-aqueous and/or substantially acid-free turpentine liquid, and substantially free of sulfur compounds, acids, or salts. Thus, in these embodiments, the present invention avoids the drawbacks and ineffectiveness associated with sulfur-containing, acidic and/or aqueous compositions of corrosion and/or scaling treatments.

As used herein, the term "non-active" shall mean that the ingredient is not present in an effective active amount for corrosion and/or scaling inhibition.

In one embodiment, the inventive method substantially reduces the corrosion rate of a corrodible surface contacted with a sulfur-containing material when compared to corrosion of the same surface when contacted with the same, sulfur-containing material in the absence of the turpentine liquid.

As used herein, the term "substantially reduces" shall mean the rate of corrosion is reduced by at least about 2-fold as compared to corrosion of said surface when contacted with said sulfur-containing material in the absence of contact with the composition. Preferably, the rate of corrosion is reduced by at least about 3-fold, and yet more preferably, the rate of corrosion is reduced by at least about 4-fold as compared to corrosion of said surface when contacted with said sulfur-containing material in the absence of contact with the composition.

In one embodiment, the turpentine liquid comprises α-terpineol, β-terpineol, β-pinene, p-cymene, or a combination thereof. In a preferred embodiment, the turpentine liquid comprises about 40 to 60% α-terpineol, about 30 to 40% β-terpineol, about 5 to 20% β-pinene, and about 0 to 10% p-cymene. In another preferred embodiment, the turpentine liquid comprises about 40 to 60% α-terpineol or β-terpineol, about 5 to 40% α-pinene or β-pinene, and about 0 to 20% p-cymene.

In certain embodiments, the sulfur-containing material that contacts a corrodible surface to be protected is a sulfur-containing liquid, gas, vapor, solid, or a combination thereof. Such sulfur-containing materials may contain elemental sulfur, sulfur-containing acids, sulfur-containing salts, organic sulfur compounds, inorganic sulfur compounds, or combinations thereof.

In another embodiment of the invention, the inventive method of includes a further step for separating the turpentine liquid from the sulfur-containing material. In a preferred embodiment, the separated turpentine liquid is recycled.

In one embodiment of the inventive method, the composition is applied as a layer on a corrodible surface. In certain embodiments, the layer is applied directly on said surface. In other embodiments, the layer is directly applied to the corrodible surface and is then covered by another protective layer. In another embodiment, the composition is applied as a layer over a protective layer which has been applied directly onto the corrodible surface. In one embodiment, the protective layer, which is applied over and/or under the layer of the inventive composition, is an insulation layer.

In certain embodiments, the invention provides a method of removing scale from a surface in need thereof, e.g., a surface prone to scaling or a surface with scale buildup. The inventive method includes the steps of mechanically removing existing scale from the surface, contacting the surface with a composition including an effective amount of a scale-removing turpentine liquid. The turpentine liquid includes at least one of natural turpentine, synthetic turpentine, mineral turpentine, pine oil, α-pinene, β-pinene, α-terpineol, β-terpineol, γ-terpineol, polymers thereof, and mixtures thereof. In certain other embodiments, the turpentine liquid is selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In other embodiments, the turpentine liquid is selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof. Preferably, the scale-removing turpentine liquid includes α-terpineol, β-terpineol, β-pinene, p-cymene, or combinations thereof. Even more preferably, the turpentine liquid includes about 40 to 60% α-terpineol, about 30 to 40% β-terpineol, about 5 to 20% β-pinene, and about 0 to 10% p-cymene. Yet more preferably, the turpentine liquid includes about 40 to 60% α-terpineol or β-terpineol, about 5 to 40% α-pinene or β-pinene, and about 0 to 20% p-cymene.

The inventive method provides an advantageous technique for inhibiting corrosion of a corrodible surface that is prone to corrosion caused by its reaction with sulfur-containing materials. The technique includes contacting the sulfur-containing material with a composition containing a turpentine liquid, contacting the corrodible surface with the composition, or contacting both the surface and the sulfur-containing material with the inventive composition. Any type of corrosion may be inhibited by the inventive method, including pitting corrosion, general or uniform corrosion, creep corrosion, stress corrosion, blistering, vapor phase corrosion, crevice corrosion, welding corrosion, and microbial corrosion.

Corrodible surfaces that can be treated with the presently claimed method include metal surfaces, concrete surfaces, composite surfaces, plastic surfaces, natural polymer surfaces, wood surfaces, and glass surfaces.

In one embodiment, the inventive method involves contacting the surface to be treated prior to and/or during reaction of the surface with a sulfur-containing material.

The inventive method also inhibits and/or reduces scale from building up on a surface that is prone to scale buildup. This scale build up can be caused by contact with sulfur-containing material and/or other ionic and mineral scales. The method involves treating the scale-causing material with a composition containing a turpentine liquid, contacting the surface with the composition, or contacting both the material and the surface with the composition. In one embodiment, the scale can be caused by contact with sulfur or sulfur compounds in any material and the scale can form as a by product of corrosion or by adhesion of sulfur and other precipitates to surfaces prone to scaling. Thus, in certain embodiments, the inventive method can be used to inhibit and/or reduce scaling formation on surfaces before corrosion. The scale causing sulfur may be found in any material including non-hydrocarbon-containing materials, hydrocarbon-containing materials, and mixtures thereof.

The inventive method can also include the step of mechanically removing scale from said surface, before, during or after treatment with the inventive composition. The inventive method involves reducing the adhesion of sulfur to the surface which is prone to scale buildup in the absence of the inventive composition. Further, the method involves reducing the agglomeration of sulfur in the sulfur-containing material.

WORKING EXAMPLES

Example 1

The effect of corrosion inhibitors on the corrosion rate of API X-65 carbon steel in a simulated sulfur-containing environment was tested. The environment was ASTM substitute seawater with 500 ppm $Na_2S$, pH adjusted to 4.8 using acetic acid. Inhibitor concentrations of 100 ppm were used in each of the applicable tests. A baseline solution was also tested. The test temperature was 100° F. on all tests. Two week stirred glass reaction kettle tests were used to determine the general corrosion rate and examine the formation of localized corrosion in a sour environment with and without various corrosion inhibitors.

Chemical analysis of the steel test coupons is given in Table 1 (weight %):

| C | P | S | Si | Mn | Cr | Mo | Al |
|---|---|---|----|----|----|----|----|
| .060 | .008 | .005 | .300 | 1.330 | .050 | .030 | .020 |

| B | Cu | Ni | N | Nb | Ca | Ti | V |
|---|----|----|---|----|----|----|---|
| .0022 | .300 | .010 | .0093 | .048 | .0032 | .017 | .023 |

The physical properties of the steel test coupons were:
Tensile Strength, KSI: 86.32
Yield Strength, KSI: 76.24
Elongation, % in 2 in.: 37.0

The chemical composition of the substitute seawater is given in Table 2:

| Component | Weight % |
|-----------|----------|
| NaCl | 58.490 |
| $MgCl_2 \cdot 6H_2O$ | 26.460 |
| $Na_2SO_4$ | 9.750 |
| $CaCl_2$ | 2.765 |
| KCl | 1.645 |
| $NaHCO_3$ | 0.477 |
| KBr | 0.238 |
| $SrCl_2 \cdot 6H_2O$ | 0.095 |
| $H_3BO_3$ | 0.071 |
| NaF | 0.007 |

The corrosion tests were conducted in one-liter glass reaction kettles. The test coupons were mounted using PTFE supports (see FIG. 1A) and crevice washers (see FIG. 1B). The crevice washers produce crevices on the coupons that can be statistically analyzed. The test solution (ASTM substitute seawater) was deaerated for a minimum of 16 hours with $N_2$ in the glass reaction kettle and then heated to 100° F. before being transferred. The PTFE mounted samples and the various corrosion inhibitors (where applicable) were placed in the reaction kettle and purged with $N_2$ for one hour. $Na_2S$ was allowed to liquefy by mixing it with deaerated test solution and then injected into the solution transfer line prior to the actual transfer of solutions. The test solution was pushed out of the reaction kettle and into the vessel containing the coupons using gas pressure. The vessel was then heated to 100° F. $N_2$ was slowly bubbled through the reaction kettles for the duration of the test to prevent oxygen contamination. The duration of the test was 14 days. After testing, the coupons were cleaned according to ISO 9226, and the corrosion rates determined. The coupons were examined for localized corrosion (pitting and/or crevice corrosion).

Figure 2:
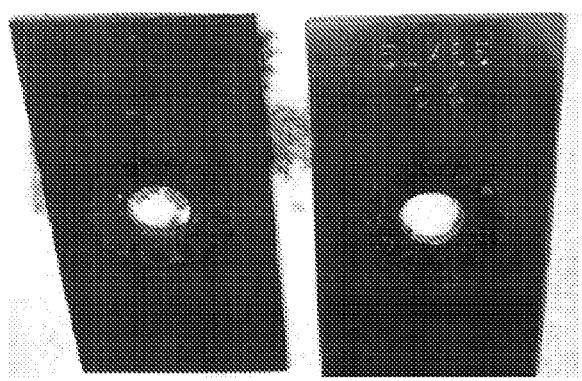
FIG. 2 shows the test coupons 01 and 02 from the baseline test.
Figure 2:
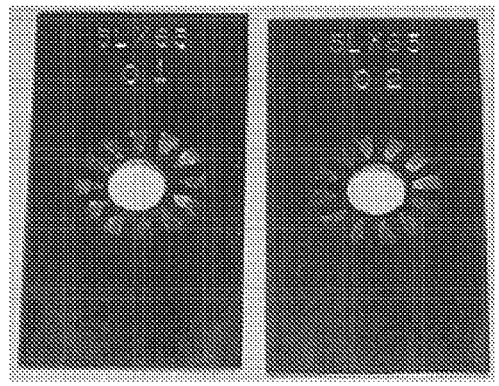
Figure 3:
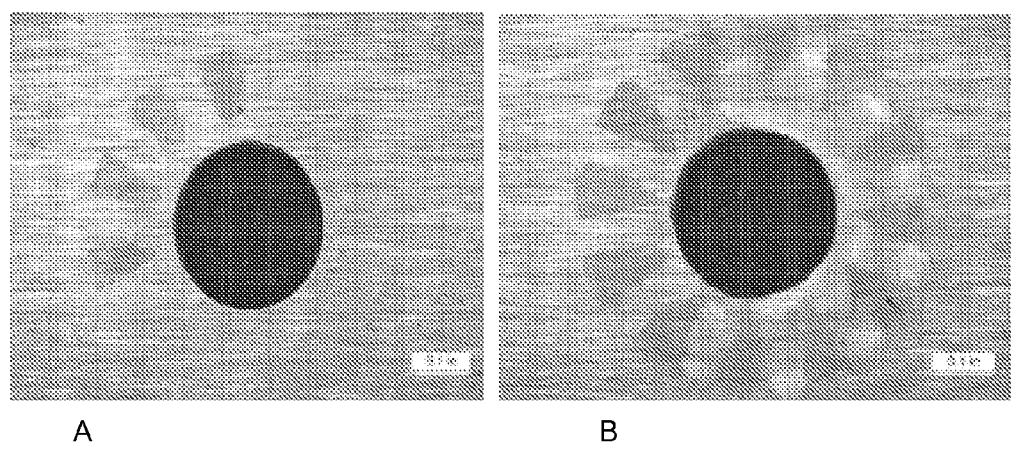
FIG. 3 shows a 65× close up of the baseline test coupon crevice attack.

Baseline solution results. The test coupons tested with baseline solution showed crevice and localized corrosion (see FIGS. 2 and 3).

The corrosion rate data for these test coupons are given in Table 3:

|  | Sample | |
| --- | --- | --- |
|  | 01 | 02 |
| Initial Weight (g) | 16.1143 | 16.3113 |
| Final Weight (g) | 16.1066 | 16.3037 |
| Weight Loss (g) | 0.0077 | 0.0076 |
| Surface area (cm$^2$) | 27.8435 | 27.9573 |
| Corrosion Rate (mpy) | 0.36 | 0.36 |
| Average Corrosion Rate (mpy) | 0.36 | |

Figure 4:
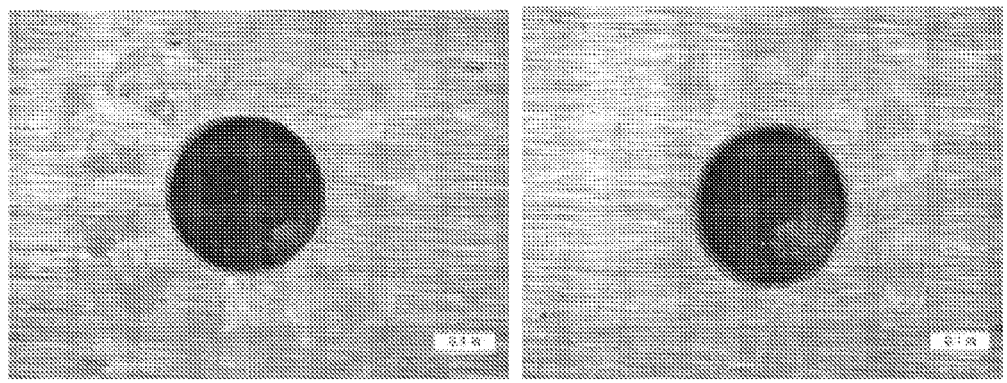
FIG. 4 shows a 65× close up of the inhibitor test coupon crevice attack.
Figure 4:
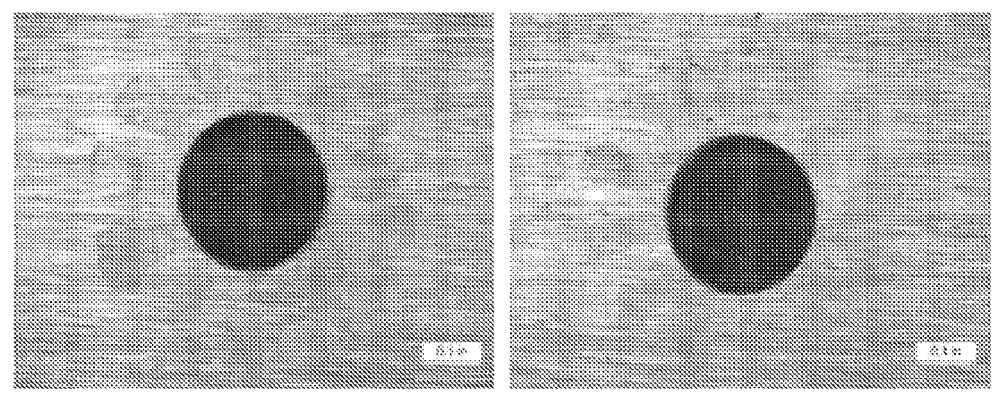
Figure 4:
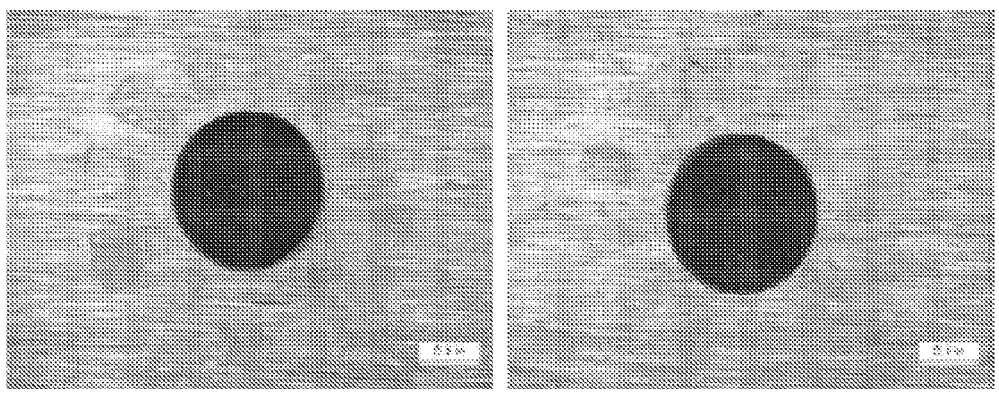

Inhibitor results. The test coupons tested with three different inhibitor compositions (I-III) demonstrated significantly reduced corrosion rates compared to the baseline samples. Inhibitor I included 50% α-terpineol, 30% β-pinene, 10% α-pinene, and 10% para cymene. Inhibitor II included 50% α-terpineol, 10% β-pinene, 10% α-pinene, and 30% para cymene. Inhibitor III included 40% α-terpineol, 30% β-pinene, 10% α-pinene, and 20% para cymene. Here, the average corrosion rates were 0.28 (Inhibitor II), 0.24 (Inhibitor I), and 0.09 (Inhibitor III) mpy (see FIGS. 4 A-C). The corrosion rates recorded directly coincide with the amount of crevice attack observed on each test coupon.

Example 2

The effect of corrosion inhibitors on the corrosion rate of AISI 1018 carbon steel in a simulated elemental sulfur-containing environment was tested. The environment was distilled water with elemental sulfur added at 1.6 g/L (0.05 mol/l). About 0.15 mol of each inhibitor was used in each of the applicable tests (3:1 molar ratio of inhibitor to sulfur). A baseline solution was also tested. The test temperature was 300° F. on all tests. The corrosion tests were conducted in one-liter, PTFE lined stainless steel autoclaves. No crevice washers were used.

Chemical analysis of the steel test coupons is given in Table 4 (weight %):

| C | Al | Ca | Cr | Cu | Mn | Mo | Ni | P | S | Si |
| --- | --- | --- | --- | --- | --- | --- | --- | --- | --- | --- |
| 0.19 | .03 | .001 | .03 | .08 | .67 | .02 | .04 | .006 | .001 | .02 |

Figure 5:
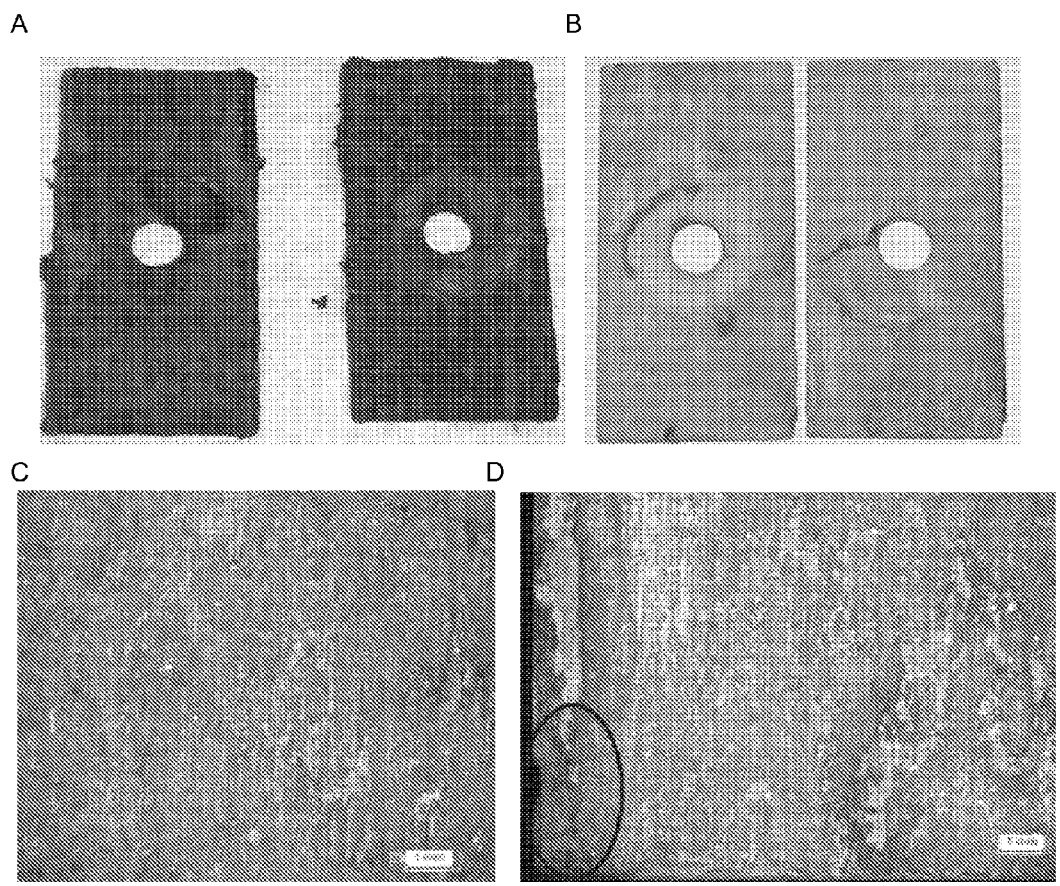
FIG. 5 shows the 14 day baseline coupons upon removal from the test (FIG. 5A) and after cleaning (FIG. 5B).

Baseline solution results. The test coupons tested with baseline solution showed extensive corrosion showing both edge and pitting attack (see FIG. 5). The corrosion rate data for these baseline test coupons are given in Table 5:

|  | Sample | |
| --- | --- | --- |
|  | 07 | 08 |
| Initial Weight (g) | 14.4513 | 14.5189 |
| Final Weight (g) | 13.5795 | 13.5552 |
| Weight Loss (g) | 0.8718 | 0.9637 |
| Surface area (cm$^2$) | 27.8610 | 27.8823 |
| Corrosion Rate (mpy) | 40.79 | 45.05 |
| Average Corrosion Rate (mpy) | 42.92 | |

Figure 6:
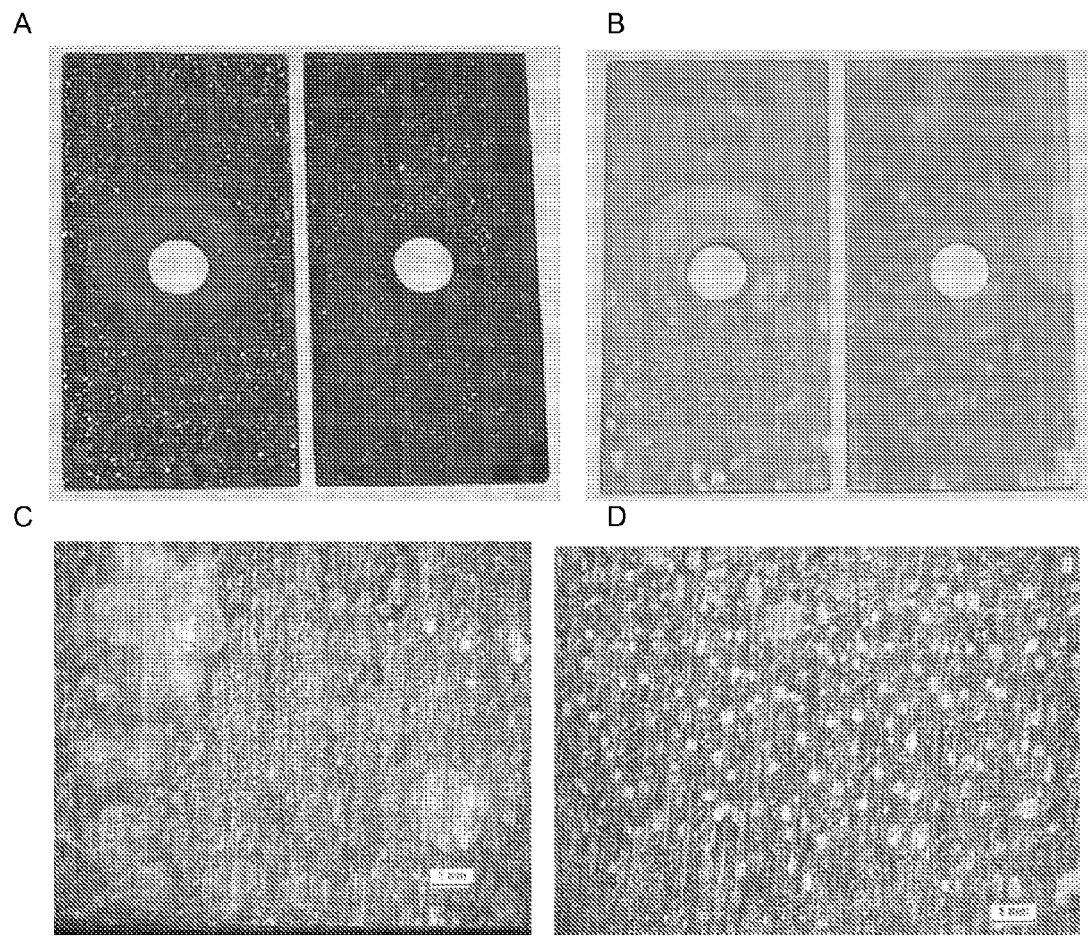
FIG. 6 shows the 14 day inhibitor I coupons upon removal from the test (FIG. 6A) and after cleaning (FIG. 6B).
Figure 7:
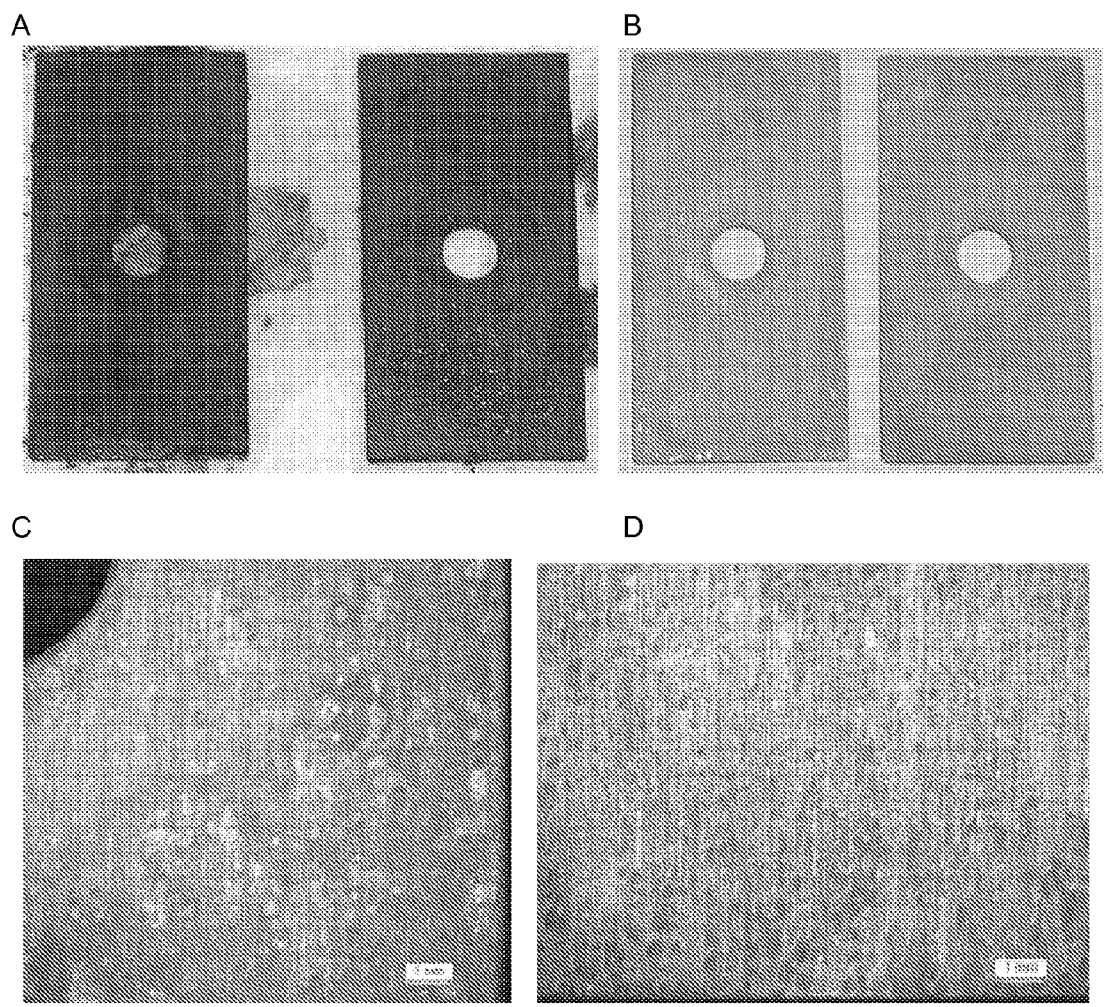
FIG. 7 shows the 14 day inhibitor II coupons upon removal from the test (FIG. 7A) and after cleaning (FIG. 7B).

Inhibitor results. The test coupons tested with inhibitor compositions demonstrated significantly reduced corrosion rates compared to the baseline samples. Here, the average corrosion rates were 20.61 for Inhibitor I (see FIG. 6) and 12:90 mpy for Inhibitor II (see FIG. 7).

Figure 8:
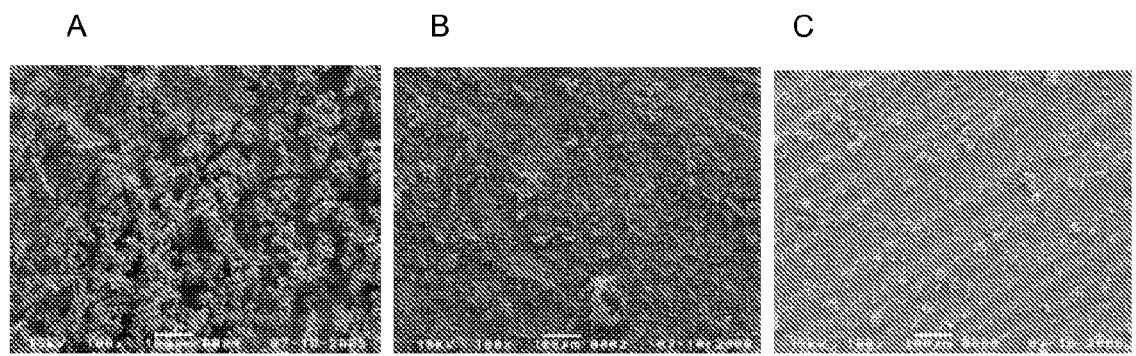
FIG. 8 shows SEM images (100× magnified) of the baseline (FIG. 8A), inhibitor I (FIG. 8B), and inhibitor II (FIG. 8C) corrosion products after the 14 day tests with a 3:1 inhibitor to sulfur molar ratio.

Scanning electron microscope images of the coupon surfaces after testing in each of the 14 day 3:1 inhibitor to sulfur molar ratio environments (see FIG. 8). The baseline coupon had a voluminous corrosion product (see FIG. 8A). The inhibitor I coupon had a relatively smooth corrosion product with some areas of heavier deposits (see FIG. 8B). The inhibitor II coupon had a smooth corrosion product with very few areas of heavier deposits (see FIG. 8C).

Table 6 provides the compositional analysis of corrosion products for the three test coupons (atomic %):

| Sample | S | Fe | Cr | Si | O |
| --- | --- | --- | --- | --- | --- |
| Baseline | 58.65 | 41.35 | — | — | — |
| Inhibitor I | 46.19 | 53.56 | 0.16 | 0.08 | — |
| Inhibitor II | 51.19 | 47.12 | 0.09 | 0.50 | 1.10 |

In an accelerated corrosion test, the test duration has a significant influence on the absolute corrosion rate. Most general corrosion mechanisms exhibit an asymptotically decreasing corrosion rate with time. This causes short term tests to artificially appear to have a higher corrosion rate than long term tests. Thus, a baseline test is performed for each time period, permitting comparison, regardless of the absolute corrosion rate.

In these tests, the inhibitors were effective for protecting against pitting. In the case of pitting, the general corrosion rate is much less significant than the depth of attack. If the depth of attack is large, the pipe may fail, even with a reasonable general corrosion rate. The inventive corrosion-inhibiting compositions were effective in mitigating the depth of attack caused by the elemental sulfur.

Example 3

The effect of corrosion inhibitors on the formation of localized corrosion of AISI 1018 carbon steel in a sulfur-containing environment was tested. Colloidal sulfur (0.4 g) was used in testing. The sulfur was melted to form approximately 3 pieces of sulfur for each coupon. The three sulfur pieces were then placed on top of each horizontally mounted steel coupon. For the inhibited tests, the sulfur pieces were exposed to neat inhibitors for approximately 1 hour. The test environment was deaerated substitute seawater, saturated with 86 psig $H_2S$ and 20 psi $CO_2$ for a total pressure of 106 psig prior to heating to 140° F. (60° C.). The tests consisted of a baseline test with unexposed sulfur and two tests with inhibitor exposed sulfur. The corrosion tests were conducted in one-liter, stainless steel autoclaves. The coupon was suspended off the bottom of the autoclave using PTFE supports. The uninhibited test was slowly stirred, but there was no stirring in the inhibited tests. The test duration was 6 days. After exposure the coupon was removed from the autoclave and photographed. The coupon was cleaned, and the corrosion rate and localized corrosion determined.

Chemical analysis of the steel test coupons is given in Table 7 (weight %):

| C | Al | Cr | Cu | Mn | Ni | P | S | Si |
|---|---|---|---|---|---|---|---|---|
| 0.17 | .042 | .04 | .02 | .80 | .01 | .014 | .002 | .022 |

Figure 9:
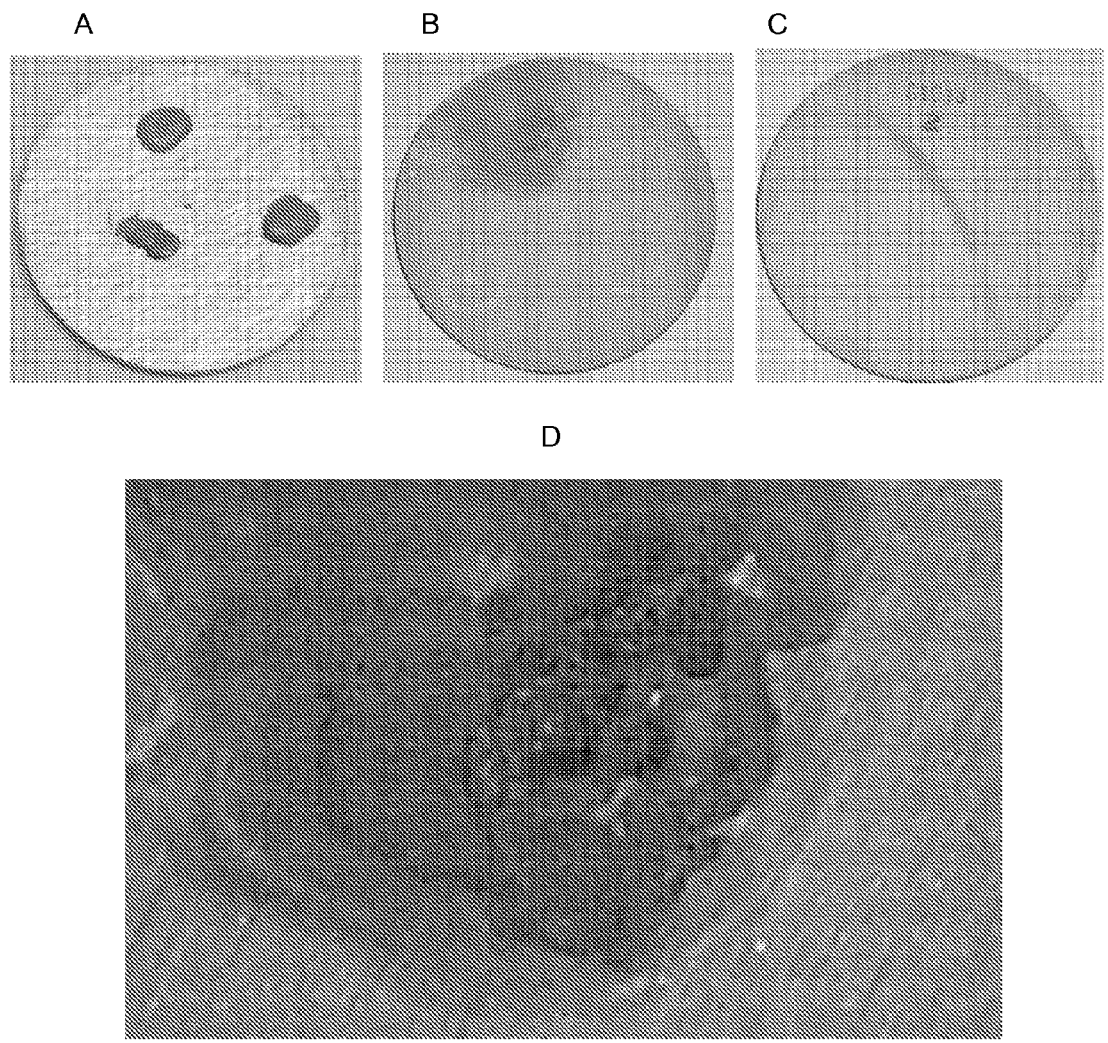
FIG. 9 shows the uninhibited test coupons in solid elemental sulfur tests.

Baseline solution results. The test coupons tested with baseline solution showed pitting in one of the three sulfur piece locations on the uninhibited coupon (see FIGS. 9A-C). It is likely that the sulfur came off at the other two locations due to the agitation. The maximum pitting depth was 24 mils, with a close up view of the pitted area shown in FIG. 9D. If the pitting rate during the six day test were constant over a year, the depth of attack would be 1402 mils, or almost 1½ inches. This shows the extensive damage that can be done on a metal by free sulfur. The general corrosion rate over the surface of the coupon was 26 mpy.

Figure 10:
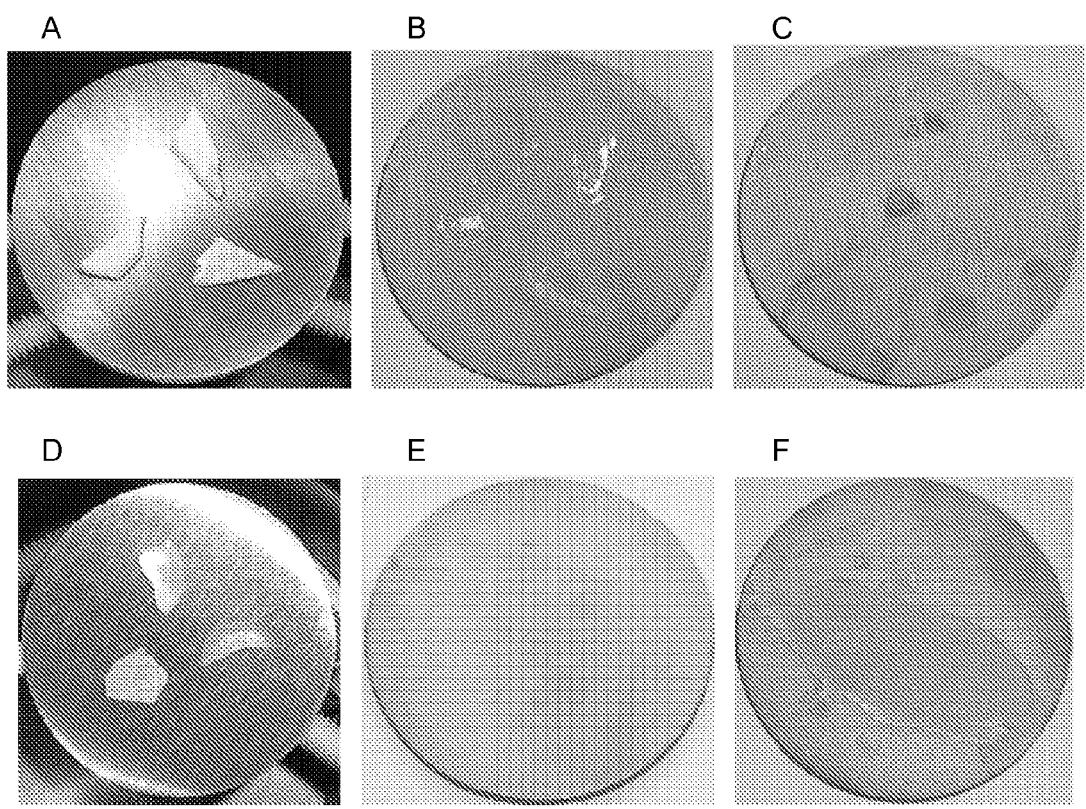
FIG. 10 shows the inhibited test coupons in solid elemental sulfur tests.

Inhibitor results. The test coupons tested with sulfur pieces contacted with inhibitors demonstrated a lack of pitting corrosion. There were some markings on the top of the sample where the sulfur had initially been placed. FIGS. 10A-C show the inhibitor I coupon and FIGS. 10D-F show the inhibitor II coupon after cleaning. This solution was not stirred, and the spots on the bottom of the coupon are likely due to gas bubbles. The general corrosion rate over the surface of the coupon was 11 mpy for the inhibitor I coupon and 19 mpy for the inhibitor II coupon. None of the sulfur pieces remained on the coupon surface at the end of the test, even without agitation demonstrating that the inhibitors prevent the adhesion of sulfur to the metal surface.

Example 4

Figure 11:
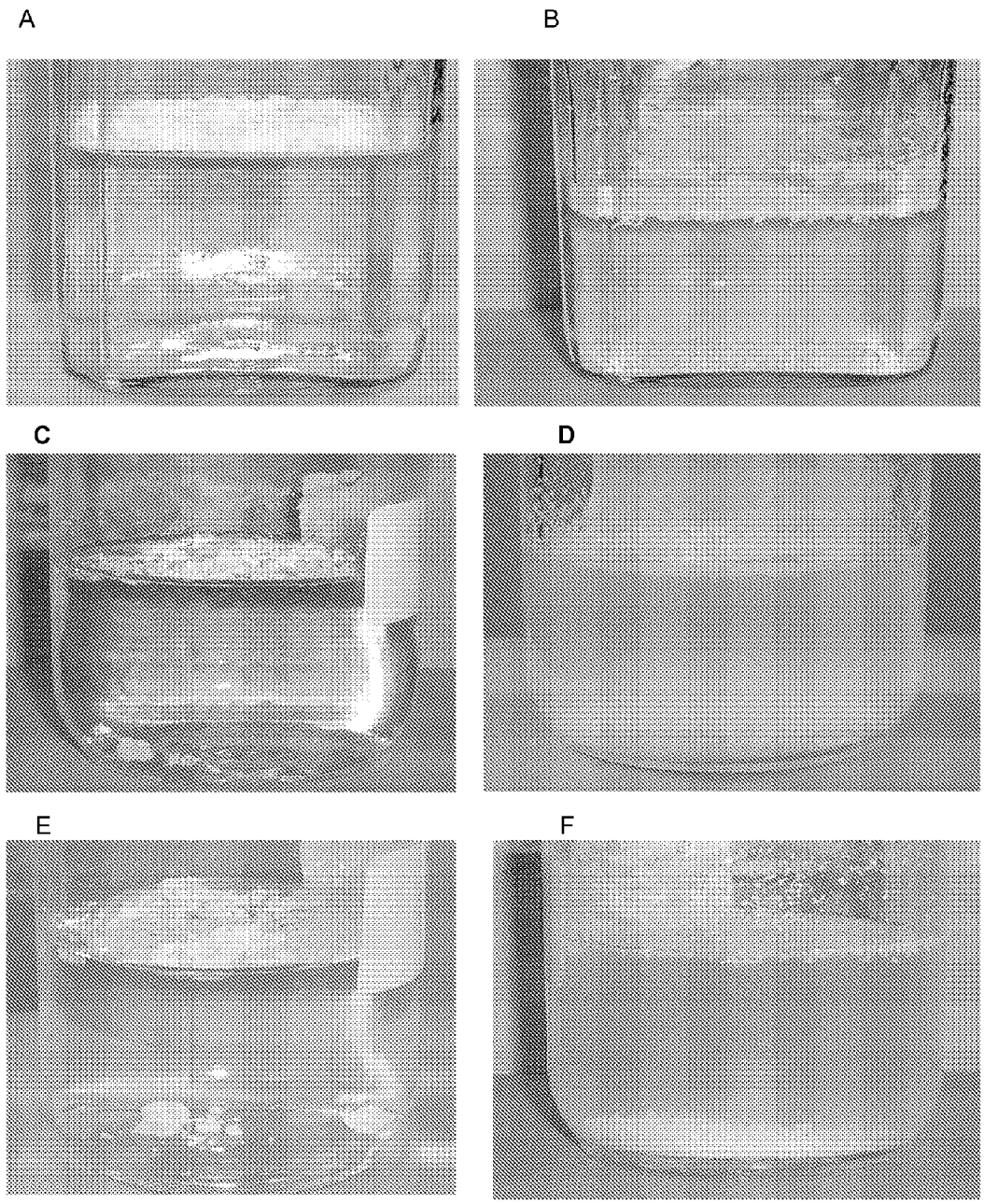
FIG. 11 shows the sulfur surface adherence and agglomeration tests.

This test was conducted to determine the surface adherence of free sulfur as well as the extent to which the inhibitor causes sulfur to agglomerate. Powdered sulfur (1 g) was added to 100 mL of distilled water in 6 oz bottles at room temperature (FIG. 11A). The inhibitors were injected at 1000 ppm and the bottles vigorously shaken 50 times. Photographs were taken before (FIGS. 11A, C, E) and after shaking (FIGS. 11B, D, F), and the effect of the inhibitors on the dispersibility of the sulfur was recorded (see FIGS. 11C-F).

The adherence of the sulfur to the sides of the glass container was significantly reduced in the inhibited tests. This indicates that the inhibitor sequesters the sulfur from the surface of the glass. This is an indicator of reduction in polarity between the free sulfur and glass or silica. Further, the sulfur did not agglomerate in the presence of the inhibitors.

Other embodiments of the present invention will be apparent to those skilled in the art from consideration of the specification and practice of the invention disclosed herein as well as equivalents thereof. It is intended that the specification and examples be considered as exemplary only, with a true scope and spirit of the present invention being indicated by the following claims and equivalents thereof.

What is claimed is:

1. A method of treatment for inhibiting sulfur-based corrosion or scaling or for removing scaling from a surface, said method selected from the group consisting of inhibiting corrosion caused by sulfur-containing materials, reducing corrosion caused by sulfur-containing materials, inhibiting scaling caused by sulfur-containing materials, reducing scaling caused by sulfur-containing materials, and removing scaling caused by sulfur-containing materials, comprising contacting said sulfur-containing material with a composition comprising a turpentine liquid, contacting said surface with said composition, or a combination thereof, wherein said turpentine liquid comprises α-terpineol, β-terpineol, β-pinene, and p-cymene.

2. A method of treatment for inhibiting sulfur-based corrosion or scaling or for removing scaling from a surface, said method selected from the group consisting of inhibiting corrosion caused by sulfur-containing materials, reducing corrosion caused by sulfur-containing materials, inhibiting scaling caused by sulfur-containing materials, reducing scaling caused by sulfur-containing materials, and removing scaling caused by sulfur-containing materials, comprising contacting said sulfur-containing material with a composition consisting essentially of a turpentine liquid, contacting said surface with said composition, or a combination thereof, wherein said contacting comprises applying said composition as a layer on said surface, wherein said layer is applied directly on said surface, and wherein said layer directly applied to said surface is covered by another protective layer.

3. A method of treatment for inhibiting sulfur-based corrosion or scaling or for removing scaling from a surface, said method selected from the group consisting of inhibiting corrosion caused by sulfur-containing materials, reducing corrosion caused by sulfur-containing materials, inhibiting scaling caused by sulfur-containing materials, reducing scaling caused by sulfur-containing materials, and removing scaling caused by sulfur-containing materials, comprising contacting said sulfur-containing material with a composition consisting essentially of a turpentine liquid, contacting said surface with said composition, or a combination thereof, wherein said composition is applied as a layer over a protective layer applied directly on said surface.

4. The method of claim 3, wherein said protective layer is an insulation layer.

5. A method of treatment for inhibiting sulfur-based corrosion or scaling or for removing scaling from a surface, said method selected from the group consisting of inhibiting corrosion caused by sulfur-containing materials, reducing corrosion caused by sulfur-containing materials, inhibiting scaling caused by sulfur-containing materials, reducing scaling caused by sulfur-containing materials, and removing scaling caused by sulfur-containing materials, comprising contacting said sulfur-containing material with a composition consisting essentially of a turpentine liquid, contacting said surface with said composition, or a combination thereof, wherein said composition is applied to said surface as a paint or a coating.

6. A method of removing scale from a surface in need thereof, comprising
   a) mechanically removing scale from said surface; and
   b) contacting said surface with a composition consisting essentially of an effective amount of a scale-removing turpentine liquid.

7. The method of claim 6, wherein said turpentine liquid comprises α-terpineol, β-terpineol, β-pinene, p-cymene, or combinations thereof.

8. The method of claim 7, wherein said turpentine liquid comprises
   about 40 to 60% α-terpineol,
   about 30 to 40% β-terpineol,
   about 5 to 20% β-pinene, and
   about 0 to 10% p-cymene.

9. The method of claim 6, wherein said turpentine liquid comprises
about 40 to 60% α-terpineol or β-terpineol,
about 5 to 40% α-pinene or β-pinene, and
about 0 to 20% p-cymene.

10. A method of inhibiting corrosion of a corrodible surface selected from the group consisting of a composite, a concrete, a plastic, a natural polymer, a wood, and a glass surface, wherein said surface is prone to corrosion caused by reaction with a sulfur-containing material, comprising contacting said sulfur-containing material with a composition consisting essentially of a turpentine liquid, contacting said surface with said composition, or a combination thereof.

11. The method of claim 10, wherein said corrosion is selected from the group consisting of pitting corrosion, general or uniform corrosion, creep corrosion, stress corrosion, blistering, vapor phase corrosion, crevice corrosion, welding corrosion, and microbial corrosion.

12. The method of claim 10, wherein said contacting occurs prior to or during reaction of said surface with a sulfur-containing material.

13. A method of inhibiting or reducing scale from building up on a surface, wherein said surface is prone to scale buildup caused by contact with sulfur-containing material, comprising treating said sulfur-containing material with a composition consisting essentially of a turpentine liquid, contacting said surface with said composition, or a combination thereof.

14. The method of claim 13, further comprising mechanically removing scale from said surface.

15. A method of inhibiting or reducing scale from building up on a surface, wherein said surface is prone to scale buildup caused by contact with sulfur-containing material, comprising treating said sulfur-containing material with a composition comprising a turpentine liquid, contacting said surface with said composition, or a combination thereof, wherein said turpentine liquid comprises α-terpineol, β-terpineol, β-pinene, and p-cymene.

16. The method of claim 13, wherein said turpentine liquid comprises
about 40 to 60% α-terpineol,
about 30 to 40% β-terpineol,
about 5 to 20% β-pinene, and
about 0 to 10% p-cymene.

17. The method of claim 13, wherein said turpentine liquid comprises
about 40 to 60% α-terpineol or β-terpineol,
about 5 to 40% α-pinene or β-pinene, and
about 0 to 20% p-cymene.

18. The method of claim 14, wherein said sulfur-containing material is contacted with about 1 ppm to 10,000 ppm of said turpentine liquid.

19. The method of claim 18, wherein said sulfur-containing material is contacted with about 10 ppm to 1,000 ppm of said turpentine liquid.

20. The method of claim 19, wherein said sulfur-containing material is contacted with about 50 ppm to 500 ppm of said turpentine liquid.

21. The method of claim 13, wherein the ratio of said turpentine liquid to said sulfur-containing material is about 1:10 to 10:1.

22. The method of claim 13, wherein the ratio of said turpentine liquid to said sulfur-containing material is greater than or equal to about 1:1.

23. The method of claim 22, wherein said ratio is about 3:1 to 5:1.

24. The method of claim 13, comprising reducing the adhesion of sulfur to said surface.

25. The method of claim 13, comprising reducing the agglomeration of sulfur in said sulfur-containing material.

26. The method of claim 13, wherein said sulfur-containing material is a non-hydrocarbon containing material.

27. The method of claim 13, wherein said sulfur-containing material is a hydrocarbon containing material.

* * * * *